US005209445A

United States Patent [19]

Bergetz

[11] Patent Number: 5,209,445

[45] Date of Patent: May 11, 1993

[54] TELEVISION SUPPORT MEMBER SECURITY MOUNTING ASSEMBLY

[76] Inventor: Carl A. Bergetz, 7805 Greenfield St., River Forest, Ill. 60305

[21] Appl. No.: 760,098

[22] Filed: Sep. 16, 1991

[51] Int. Cl.[5] ............ F16M 13/00

[52] U.S. Cl. ............ 248/551; 312/7.2; 70/58

[58] Field of Search ............ 248/551, 552, 553; 108/94; 312/215, 245, 7.2; 70/58, 232

[56] References Cited

U.S. PATENT DOCUMENTS

| | | | |
|---|---|---|---|
| 2,808,223 | 10/1991 | Abeles et al. . | |
| 3,291,432 | 3/1981 | Lucasey . | |
| 3,908,942 | 1/1980 | Keith et al. . | |
| 4,002,831 | 1/1977 | Aeschliman | 312/7.2 X |
| 4,268,099 | 4/1981 | Clausen . | |
| 4,300,371 | 11/1981 | Herwick . | |
| 4,305,266 | 12/1981 | Lockwood | 70/58 |
| 4,579,311 | 4/1986 | Spranza, III | 70/58 X |
| 4,709,897 | 12/1987 | Mooney | 248/551 |
| 4,738,428 | 4/1988 | Themistos . | |
| 4,739,637 | 4/1988 | Finkel et al. | 70/58 |
| 4,884,420 | 12/1989 | Finkel et al. | 70/58 |
| 4,893,777 | 1/1990 | Gassaway | 248/551 |

*Primary Examiner*—Blair M. Johnson

[57] ABSTRACT

A security mounting assembly for an electrical appliance, such as a color television set includes a television cabinet having an engagement member formed therewith and a separate support member having a retaining flange which receives the engagement member. The engagement member may include a lug or foot integrally formed in the television cabinet and extending therefrom. The retaining flange extends from the support member to form a lip extending along a frontal edge thereof which defines a recess into which the engagement lug or foot projects. The cabinet is held in place on the support member by a series of fasteners and is held in such a manner that the cabinet engagement members may not be readily removed from the support member retaining flange.

20 Claims, 2 Drawing Sheets

TELEVISION SUPPORT MEMBER SECURITY MOUNTING ASSEMBLY

BACKGROUND AND SUMMARY OF THE INVENTION

The present invention relates generally to mounting systems for electrical appliances, such as television receiving, and more particularly, to a mounting assembly wherein mounting means are integrally formed within a television cabinet and securely and substantially non-removably engage a support member such as a flat tray.

Color and stereo television receivers and monitors are a necessary appliance for hotel rooms, hospital rooms and public meeting rooms. Such appliances are tempting targets for burglars and thieves. The theft of television sets is a serious problem to hotel chains and the like. Thus, the need exists for apparatus to securely mount televisions within areas such as hotel rooms. Numerous such assemblies exist in the art. Some security systems, such as that described in U.S. Pat. No. 4,268,099 issued May 19, 1991 utilize cables attached to the television or appliance which are supported on a rack or the like. These cables are not a sufficient theft deterrent in that they can easily be cut with appropriate means such as a pair of cable cutters. Other security systems, such as that described in U.S. Pat. No 4,738,428 involve the use of locking bars or straps. Such systems are unusually bulky and may be circumvented by the use of a crowbar.

The present invention provides an alternative to such security systems and permits the secure, substantially non-removable mounting of expensive electrical appliances such as television receivers and monitors on pedestals, racks or ceiling or wall mounts. The present invention also provides a mounting system for appliances in which the means by which the appliance is held in place on the support member is substantially non-accessible from the outside of the appliance. In accordance with the present invention, one or more engagement means are formed directly in the exterior cabinet of the appliance. The engagement means ma take the form of one or more lug members molded into the television housing or cabinet which extend outwardly therefrom. These lugs engage a locking or retaining flange formed within a support member upon which the appliance is mounted.

The television cabinet is secured to the support member by means of a first set of fasteners which pass through the support member and into apertures disposed on the bottom of the television cabinet. A second set of fasteners hold the television cabinet in engagement with the support member and substantially restrict the movement of the television cabinet engagement means from the locking flange. This second set of fasteners pass through one or more skirt flanges which project along the sides of the support member and which cooperate with the first fasteners to substantially prevent lateral movement of the television cabinet upon the support member.

In this regard, it is an object of the present invention to provide a secure mounting assembly for substantially non-removably mounting an electrical appliance, such as a television receiver, wherein engagement means are integrally formed in a housing of the appliance and wherein the engagement means engages a support member in a manner such that the engagement means are not accessible from the exterior of the support member.

It is another object of the present invention to provide a security mounting assembly for a television receiver in which the television receiver includes an exterior cabinet portion, the cabinet portion having at least one retaining hook member which projects outwardly thereof and engages a support member, the retaining means hook member being held by a flange extending along an edge of the support member, the hook member being held in engagement with said retaining means by one or more fasteners extending through said support member and engaging said cabinet.

It is still a further object of the present invention to provide an easily installed security mounting system in which a substantially planar support tray includes means for engaging a television set and retaining the television set in place upon the support tray, the engagement means including a first flange which defines a recess between the first flange and the support tray, a integrally formed portion of the television cabinet projecting outwardly and engaging recesses defined by the flange, the support tray having a pair of skirt flanges extending generally perpendicularly to the support tray first flange, the skirt flanges substantially preventing lateral movement of the television cabinet upon the support tray, the mounting assembly further including fastener means extending through said skirt flanges and engaging said cabinet, said fastener means substantially preventing disengagement of the engagement means.

It is yet another object of the present invention to provide an engagement feature integrally formed within a television exterior cabinet, the engagement feature being disposed along an edge of the television cabinet, the engagement feature engaging a mounting surface in a manner which does not permit the insertion of a prying member between the television cabinet and the mounting member.

It is still another object of the present invention to provide a security mounting system for a television receiver which includes a combination of a television receiver extension cabinet and a mounting tray in which the system has first engagement means extending forwardly from the television cabinet and second engagement means extending through the support tray into the cabinet disposed at an angle from the first engagement means to hold the same in place upon the support tray.

These and other objects, features, advantages of the present invention will become readily apparent through a consideration of the following detailed description.

BRIEF DESCRIPTION OF THE DRAWINGS

During the course of the following detailed description, reference will be frequently made to the following drawings in which like reference numerals identify like parts.

DETAILED DESCRIPTION OF THE INVENTION

Figure 1:
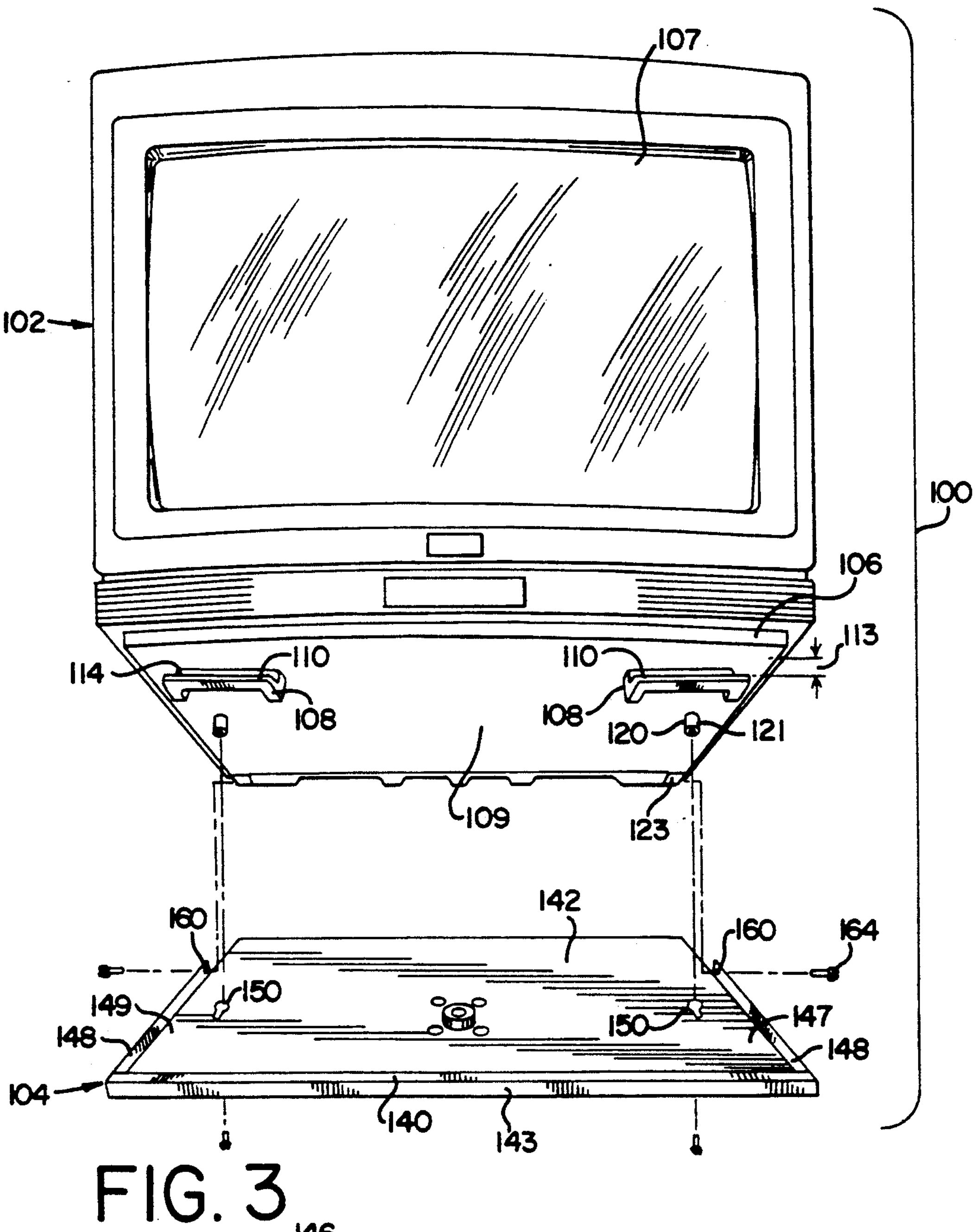
FIG. 1 is an exploded frontal view of a security appliance mounting assembly constructed in accordance with the principles of the present invention.
Figure 3:
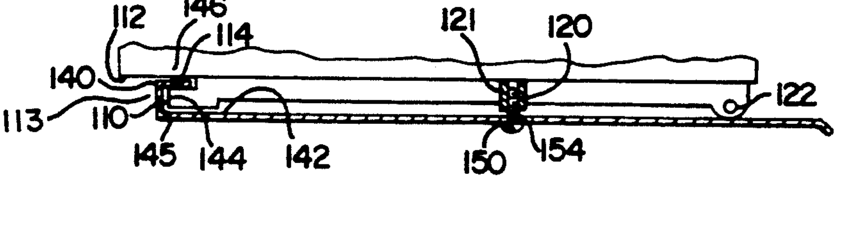
Figure 2:
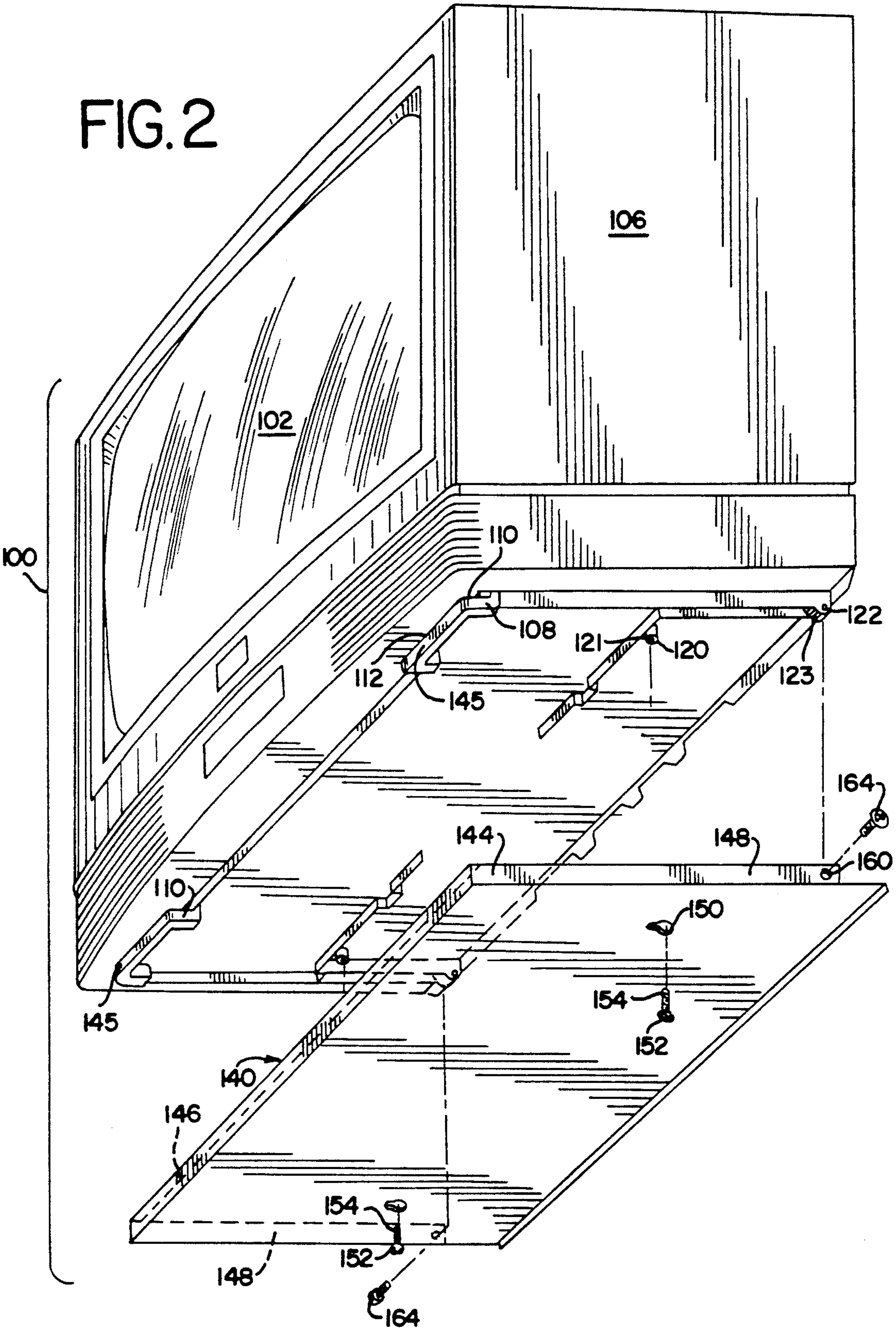
FIG. 2 is an exploded perspective view of the security mounting assembly of FIG. 1; and, FIG. 3 is a sectional view of the support member appliance cabinet interface.

A security mounting assembly 100 constructed in accordance with the principles of the present invention is illustrated in FIGS. 1-3. As shown, the assembly 100 includes an appliance, such as a television receiver 102 and a support member, such as a support tray 104. The television receiver 102 is generally typical in that the receiver 102 is housed within a housing or cabinet 106 which substantially surrounds the picture tube 107 and its associated electronic components. Importantly, the cabinet 106 is provided with integral means for engaging the support tray 104 in the form of one or more engagement hooks 108 which are integrally formed with the cabinet 106, such as by injection molding.

Each of the engagement hooks 108 preferably depends downwardly from the bottom 109 of the television cabinet 106 and projects outwardly therefrom such that an engagement face 110 of each hook 108 is aligned generally parallel with the front face 112 of the television cabinet 106. As shown best in FIGS. 1 and 3, the hooks 108 define a spacing or slot 113 between an engagement surface 114 thereof and the television cabinet bottom 109, which slot 113 is dimensioned to closely receive a support tray engagement flange 140 therein, as will be explained in greater detail below.

The cabinet 106 also includes first and second means for receiving fasteners, illustrated as fastening holes 120, 122, respectively. These fastening holes 120, 122 may be formed within corresponding bosses 121, 123 as shown, or they may be formed within a solid portion of the cabinet 106. The first set of fastening holes 120 is disposed in the bottom of the cabinet 106 and spaced a preselected distance from the hook members 108. The second set 122 of the fastening holes are preferably disposed in the sides of the cabinet 106, and are oriented generally perpendicularly to the direction of the hooks 108.

Turning now to the details of the support tray 104, (FIGS. 1 & 2) it can be seen that the support tray 104 is substantially planar and includes a mounting surface 142 defined within its four edges. As mentioned above, the support tray 104 includes an engagement flange 140 disposed along substantially the entire length of a first, or front, edge 143 thereof. The engagement flange 140 is spaced apart from the mounting surface 142 and thus defines a recess 144 therebetween. The recess 144 abuttingly receives the projecting portion(s) of each of the hook members 108 (FIG. 3). Preferably, the faces 110 of the hook members 108 abut the interior face 145 of the engagement flange 140. The top portion 146 of the engagement flange 140 is received by the slot 113 defined by the hook member 108.

In order to assist in properly positioning the television cabinet 106 on the mounting surface 142 of the support tray 104, the support tray 104 includes one or more first and second apertures 150, 160, respectively. These apertures 150 and 160 are generally correspondingly aligned with the first and second fastening holes 120, 122. Conventional security fasteners, such as security screws 152, may be inserted into the bosses 121 which define the television cabinet fastening holes 120 and the cabinet hook members 108 are then inserted into the engagement flange recess 144. As the television cabinet is slid forward, the fasteners 152 will become aligned with the support tray first apertures 150 and initially depend therethrough. Final alignment of the television cabinet 106 may then be effected by moving the cabinet 106 forwardly such that the fastener shafts 154 slide forward into a slot 155 opening into the aperture 150. The fasteners 152 and the first apertures 150 cooperate to retain the television cabinet 106 in place upon the support tray mounting surface 142.

Lateral alignment and security of the television cabinet 106 in place upon the support tray 104 is accomplished by means of one or more skirt flanges, or raised wall portions, 148 which extend laterally and rearwardly along two side edges 147, 149 of the support tray 104 and generally perpendicularly with respect to the engagement flange 140. The skirt flanges 148 preferably further extend along the support tray 104 second and third edges 147, 149 for substantially the entire length of the television cabinet 106 thereof as illustrated or they may extend a preselected length in the are proximate to the second set of cabinet fastening holes 122. The skirt flanges 148 preferably have a sufficient height to substantially cover the spacing, if any, between the television cabinet 106 and the mounting tray 104 to prevent access thereto such that it is substantially impossible to insert a prying member, such as a crowbar, between the same. The height of the skirt flanges 148 also permits the flanges 148 to abuttingly engage the cabinet 106.

The television cabinet 106 preferably also includes a second set of fastening holes 122 located in boss or lug portions 123 of the cabinet 106. These second fastening holes 122 are angularly disposed with respect to the cabinet hook members 108 and the first fastening holes 120 and are aligned with the support tray second apertures 160 when the hook members 108 are properly engaged in the support tray recess 144 and when the first fasteners 152 are engaged in the aperture slots 155. When so aligned, the cabinet 106 is secured to the support tray 104 by a second set of fasteners 162. The second fasteners 162 preferably take the form of special security screws 164 which are of a type not operable by anything but a special tool. In this regard, the screws 164 are equipped with screw heads 165 having a specially configured slot 166 which cannot be engaged by conventional tools such as blade, Phillips-head or Allen-head screwdrivers. The second fasteners 162 and skirt flanges 148 cooperate to maintain the cabinet hook members 108 in place within the support tray recess 144 and thereby substantially prevents the unauthorized removal of the cabinet 106 from the support tray 104.

When the second fasteners 162 engage the television cabinet 106, they prevent the television cabinet from being moved in a fashion to free the hook members 108 from the support tray recess 144. Because the support tray engagement flange 140 substantially seals off the space between the hook members 108 and the television cabinet base 106, a prying tool, such as a crowbar, cannot be inserted underneath the cabinet 106 between it and the support tray 104 to effect breakage of the hook members 108.

It will be appreciated that the embodiments of the present invention that have been discussed herein are merely illustrative of a few applications of the principles of the present invention. Numerous modifications may be made by those skilled in the art without departing from the true spirit and scope of the invention.

What is claimed is:

1. A security assembly for securely mounting an electrical appliance to a support member, the mounting assembly comprising:

an exterior cabinet receiving the appliance therein, said cabinet having engagement means integrally formed therein, the engagement means projecting outwardly from said cabinet, said cabinet including at least first and second fastening holes integrally formed therein and spaced apart from said engagement means, each of said first and second fastening holes being adapted to receive a fastener therein, said second fastening hole being spaced apart from said first fastening hole and said engagement means, and further being angularly disposed with respect to said first fastener hole, a support member including a base portion dimensioned to receive said cabinet thereon, the support member including retaining means including a flange disposed along an edge portion of said support member, the flange further being spaced apart from the support member edge portion to thereby define a recess for receiving said engagement means of said cabinet, said support member further including first and second apertures operatively associated with said first and second cabinet fastening holes, said support member first apertures being disposed in said support member base portion and being aligned with said cabinet first fastening hole, said support member first aperture and said cabinet first fastening hole each permitting the passage of a first fastener therethrough, said support member further including at least one skirt flange which is angularly spaced apart from said retaining flange, said support member second aperture being disposed in said skirt flange and being aligned with said cabinet second fastening hole, said cabinet second fastening hole and said support member second aperture permitting the passage of a second fastener therethrough, whereby said cabinet engagement means is held in place within said support member retaining means when said first and second fastener holes are respectively aligned with said support member first and second apertures.

2. The security assembly of claim 1, wherein said second fastener includes a security screw.

3. The security assembly of claim 1, wherein said cabinet includes two first fastening holes, each of the two first fastening holes being disposed in a boss integrally formed in said cabinet.

4. The security assembly of claim 1, wherein said cabinet includes two second fastening holes, said support member includes two second apertures, and said second fasteners include two security screws.

5. The security assembly of claim 1, wherein said cabinet engagement means includes a lug disposed beneath said cabinet, the lug depending downwardly and projecting outwardly from said cabinet, said leg member engaging said recess of said flange, and said flange extends for substantially entirely the entire edge portion of said support member.

6. The security assembly of claim 5, wherein said flange is disposed along a front edge of said support member.

7. The security assembly of claim 1, wherein said flange is disposed along a front edge of said support member and said skirt flange extends generally perpendicularly to said flange.

8. The security assembly of claim 7, wherein said support member includes two skirt flanges extending generally perpendicularly to said flange.

9. The security assembly of claim 1, wherein said support member includes means adapted to engage a mounting pedestal.

10. The security assembly of claim 8, wherein said skirt flanges extend substantially entirely along two lateral edge portion of said support member.

11. A mounting assembly for television sets comprising, a housing for the television, the housing having engagement means integrally formed therein adapted for engagement with a support member, the engagement means including at least two hook means extending outwardly from said housing and spaced apart from each other along a first edge portion of said housing, each of the hook means including a leg member spaced apart from said housing to define a slot in said hook means, the mounting assembly further including a support member having a support surface thereon, the support member having means retaining said housing thereon, the retaining means including flange means disposed along a first edge portion of said support member, said support member further including skirt means, the skirt means including a pair of wall means extending along second and third edge portions of said support member and extending angularly with respect to said flange means, said flange means including an upturned ledge spaced apart from said support surface which defines a recess in said support member first edge portion, the recess abuttingly receiving each of said hook means therein, said mounting assembly further including first fastener means extending through one of said wall means and engaging said housing, said first fastener means extending generally perpendicularly from said housing hook means to thereby substantially prevent the disengagement of said hook means from said support member retaining means and said wall means substantially preventing lateral movement of said housing on said support surface.

12. The mounting assembly of claim 11, wherein said wall means extend along said support member second and third edge portions for a distance equal or greater to a depth of said housing.

13. The mounting assembly of claim 11, wherein said first fastener means includes at least one security screw.

14. The mounting assembly of claim 11 further including second fastener means extending through said support surface and engaging said housing.

15. The mounting assembly of claim 11, wherein said wall means has a height equal to or greater than a distance between said hook means and said housing.

16. A security mounting apparatus for television receivers in which the television receiver is contained within an exterior housing, the mounting apparatus comprising, in combination:

engagement means integrally formed within said television receiver exterior housing, said engagement means extending outwardly therefrom to define at least one hook member, said engagement means further including slot means for receiving a retaining member, said television receiver exterior housing further including means for receiving at least a first fastener member therein, and a support member including a support tray having a generally planar support surface defined by at least three edge portions of said tray, the support tray having an upturned edge defining an inwardly extending retaining flange of said support tray extending along a first edge portion of said support tray, the retaining flange defining an engagement recess between said retaining flange and said support surface, the engagement recess receiving said housing engagement means therein, the support tray further having at least one rim member extending along the second edge portion of said support tray, said rim member extending upwardly from said support surface and further being disposed angularly offset with respect to said support tray retaining flange, said rim member engaging a portion of said housing by way of the first fastener passing therethrough and into a receptacle disposed in said housing, said rim member and said first fastener member cooperating to retain said housing engagement means in place within said support tray engagement recess and substantially prevent the removal of said housing from said support tray.

17. The mounting apparatus of claim 16, further including two first fastener members.

18. The mounting apparatus of claim 16, further including at least one second fastener member extending through said support tray support surface and engaging a second receptacle formed in said housing, said second fastener member further extending through a keyed aperture in said support tray whereby said second fastener member and said support tray keyed aperture cooperating to retain said housing in place upon said support surface.

19. The mounting apparatus of claim 16, wherein said housing engagement means hook member extends substantially entirely underneath said housing.

20. The mounting apparatus of claim 16, further including a second rim member extending along a third edge portion of said support tray.

* * * * *